April 11, 1967    E. M. GUYER ETAL    3,313,608
METHOD AND APPARATUS FOR MANUFACTURING GLASS BEADS
Filed Dec. 11, 1964
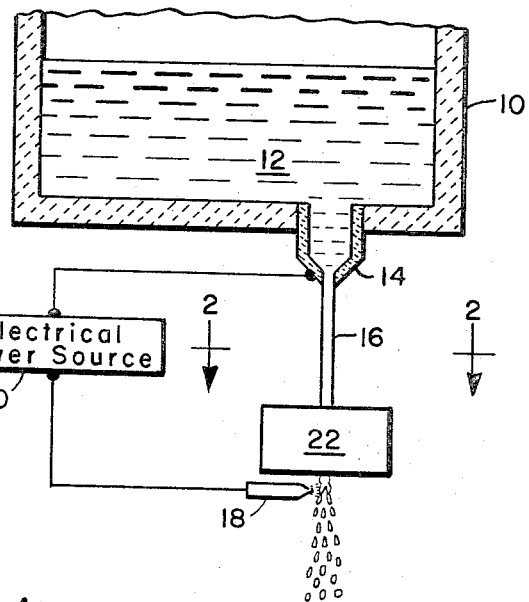
Fig. 1
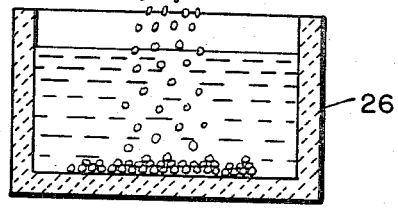
Fig. 2
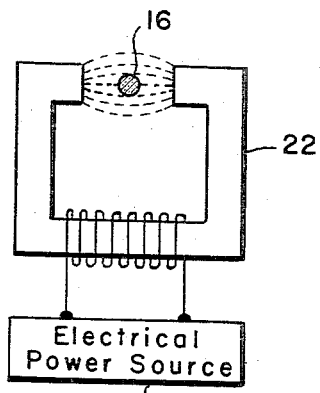
INVENTORS.
Edwin M. Guyer
Joseph E. Nitsche
BY
William D. Fordick
AGENT

United States Patent Office 3,313,608
Patented Apr. 11, 1967

3,313,608
METHOD AND APPARATUS FOR MANUFACTURING GLASS BEADS
Edwin M. Guyer and Joseph E. Nitsche, Corning, N.Y., assignors to Corning Glass Works, Corning, N.Y., a corporation of New York
Filed Dec. 11, 1964, Ser. No. 417,666
12 Claims. (Cl. 65—21)

This invention relates to the production of glass beads, and more particularly to methods and apparatus for producing glass beads directly from a stream of molten glass.

One prior art method for forming glass beads involves the grinding of glass into small particles and the injection of the particles into a flame from a burner in order to melt the particles and allow surface tension to form the particles into spheres. Among the disadvantages of such method are the facts that only very small particles can be formed and that due to the dispersing effect of the flame, collection of the beads is difficult. Further disadvantages are the large number of glass filaments formed along with the beads and the lack of economy inherent in forming operations involving the remelting of cold glass.

Other methods for forming glass spheres involve the formation of a stream of molten glass and the attenuation thereof under the influence of gravity. Such methods are subject to limitations in that it is necessary to cause the glass to fall for great distances in order to form beads, and only beads of relatively large size may be produced thereby. When the additional step of directing a burner flame against the molten stream is employed, only very small beads can be formed, and the beads are difficult to collect.

It is an object of the present invention to provide a method for forming glass beads which method is not subject to the above-mentioned disadvantages. This and other objects, which will be apparent from the detailed description of the invention, are accomplishted by a process wherein an electrical current is caused to flow along a free-falling stream of molten glass, and the current-carrying glass is caused to oscillate rapidly by interaction between the magnetic field produced by the electrical current and a second magnetic field transverse thereto, the oscillation of the stream causing the glass to separate into small particles which form spheres under the influence of surface tension.

The invention will be described with reference to the accompanying drawing, in which:

FIGURE 1 is a side elevational view, partly in section, of the apparatus utilized in the invention, and FIGURE 2 is a partial view taken on line 2—2 of FIGURE 1.

Referring to the drawing, the illustrated apparatus comprises a glass tank 10 containing therein a reservoir of molten glass 12. The molten glass flows from tank 10 through orifice 14, forming stream 16. The main body of tank 10 comprises an electrically insulating refractory material, while orifice 14 thereof comprises an electrically conductive material. An electrical current is caused to pass through stream 16 between electrode 18 and orifice 14 by means of a suitable source of electrical power, indicated by numeral 20 of FIGURE 1. Preferably, electrode 18 does not touch stream 16, but the electrical current passes between the electrode and the stream through an arc, thus preventing interruption of the stream by the electrode and accumuation of glass on the electrode.

Stream 16 passes between the poles of electromagnet 22. The relative positions of the stream and the electromagnet are preferably as indicated in FIGURE 2, the magnetic lines of force, illustrated by the broken lines, being generally perpendicular to the direction of motion of the stream.

As is well known, when a conductor having a current passing therethrough is maintained in a magnetic field having lines of force represented as vectors having components perpendicular to the direction of motion of the current in the conductor, a transverse force on the conductor results, the direction and magnitude of the force being readily calculable according to well-known laws of electricity and magnetism. It can be deduced from such laws that when either the direction of the magnetic lines of force or the direction of the flow of electrical current is reversed, the transverse force reverses in direction. This fact is utilized, according to a preferred mode of the invention, to produce vibration or oscillation of glass stream 16 in order to facilitate the disintegration thereof into small particles of molten glass capable of forming glass beads by surface tension.

Preferably, the stream is caused to oscillate by either the combination of a direct current in the stream with an alternating magnetic field or the combination of an alternating current in the stream with a constant magnetic field. In such cases, the stream will oscillate at the same frequency as that of the current or the magnetic field. It will be appreciated that when both the current and the magnetic field are alternated at the same frequency and are either in phase or 180° out of phase, the resultant force on the stream will not alternate in direction, but rather will be a pulsating force in a single direction, which will combine with the force of gravity to effect oscillation of the stream. If both the electrical current and the magnetic field alternate, but at different frequencies, the glass stream will oscillate and will have superimposed upon its oscillation a beat frequency oscillation.

Magnet 22 is preferably maintained at a location where stream 16 has begun to attenuate under the influence of gravity, so that oscillation of the stream has the effect of hastening the tendency of the stream to separate into discrete particles. After the molten particles separate from the stream, they are permitted to fall a short distance, for example, 4 feet in order to allow the surface tension to form the particles into substantially spherical beads. The beads then enter collecting tank 26, which may contain any suitable liquid, such as water or oil, for cooling and tempering the beads.

Although it will be apparent that various combinations of process parameters may be utilized to effect disintegration of a molten glass stream by oscillation thereof resulting from an electrical current in the stream and an external magnetic field, the following example is provided to illustrate a preferred mode of the invention:

The reservoir of molten glass 12 may be glass having a composition approximately 64% $SiO_2$, 14% $Na_2O$ and 22% CaO-MgO by weight. The reservoir may be maintained at a temperature of approximately 1400° C., and orifice 14 may have an aperture approximately 0.200 inch in diameter, so as to produce a molten glass stream approximately 0.150 inch in diameter in the vicinity of magnet 22. Electrical power may be supplied to stream 16 so as to produce therein a one ampere current alternating at the rate of 60 cycles per second. Magnet 22 may produce a field strength of 2000 gauss in the vicinity of the glass stream. Magnet 22 may be located approximately 8 inches below orifice 14, and glass beads in the form of spheres having diameters within the range 0.005 to 0.200 inch will be formed.

According to an alternate mode of the invention, oscillation of the glass stream may be effected by a direct current passing through the stream in combination with a direct current magnetic field. In such case, when the strengths of the respective magnetic fields are sufficient, the stream of molten glass will be deflected due to the interaction therebetween until the deflection becomes of sufficient magnitude to draw the molten glass away from electrode 18, thereby extinguishing the arc. The electrical current will then cease to flow through stream 16, and the stream will fall back in the direction of its original state of free-fall until it approaches sufficiently close to electrode 18 to permit the flow of current from the electrode to the stream, at which time the current will again flow through the stream, and deflection of the stream will once again take place. Thus, by alternate ignition and extinction of the arc, oscillation of stream 16 is effected, and glass beads are produced.

The above description has been provided solely as that of preferred modes of the invention, and, accordingly, it is intended that the scope of the invention be limited only by the scope of the appended claims.

We claim:
1. The method of agitating a stream of molten glass to facilitate the separation of said stream into particles of molten glass which comprises:
   (a) applying an electrical current through at least a portion of said stream,
   (b) applying across at least said portion of said stream a magnetic field having lines of force with components perpendicular to the direction of flow of said electrical current and a magnitude sufficient to deflect said stream, and
   (c) applying at least one of said electrical current and said magnetic field with variations in magnitude sufficient to agitate said portion of said stream.

2. The method of producing glass beads which comprises:
   (a) forming a stream of molten glass,
   (b) applying an electrical current along at least a portion of said stream,
   (c) applying across said portion of said stream a magnetic field having lines of force with components perpendicular to the path of said current, and
   (d) alternating at least one of said electrical current and said magnetic field to produce an alternating force on said stream of molten glass, whereby said force effects oscillation of said stream and facilitates the separation thereof into beads.

3. The method of facilitating separation of a stream of molten glass into particles which comprises:
   (a) applying an electrical current in a longitudinal path along at least a portion of said stream,
   (b) applying a magnetic field extending across at least a part of said portion of said stream having lines of force with components perpendicular to said longitudinal path, and
   (c) alternating at least one of said electrical current and said magnetic field.

4. The method according to claim 3 which includes alternating said electrical current, while maintaining said magnetic field unidirectional.

5. The method according to claim 4 which includes alternating said electrical current at the rate of 60 cycles per second.

6. The method according to claim 3 which includes alternating said magnetic field, while maintaining said electrical current unidirectional.

7. The method according to claim 6 which includes alternating said magnetic field at the rate of 60 cycles per second.

8. The method of producing glass beads which comprises:
   (a) forming a free-falling stream of molten glass,
   (b) applying an electrical current longitudinally along at least a portion of said stream,
   (c) applying across said portion of said stream a magnetic field having lines of force substantially perpendicular to the path of said electrical current,
   (d) alternating at least one of said electrical current and said magnetic field at the rate of approximately 60 cycles per second to produce an alternating force on said stream, whereby said force effects oscillation of said stream to cause the separation thereof into beads, and
   (e) subsequently collecting said beads in a liquid medium.

9. Apparatus for forming glass beads which comprises:
   (a) means for providing a free-falling stream of molten glass,
   (b) means for passing an electrical current along at least a portion of said stream,
   (c) means for maintaining across at least a part of said portion of said stream a magnetic field having lines of force with components perpendicular to the path of said current, and
   (d) means for causing at least one of said electrical current and said magnetic field to alternate.

10. Apparatus for forming glass beads which comprises:
    (a) means for providing a free-falling stream of molten glass,
    (b) means for passing an electrical current along at least a portion of said stream,
    (c) means for maintaining across at least a part of said portion of said stream a magnetic field having lines of force with components perpendicular to the path of said current, and
    (d) means for varying at least one of said electrical current and said magnetic field by an amount sufficient to vary the position of said portion of said stream.

11. The method of facilitating the separation of a stream of molten glass into particles which comprises:
    (a) applying a direct electrical current in a longitudinal path along at least a portion of said stream,
    (b) applying a magnetic field across at least a part of said portion of said stream having lines of force with components perpendicular to said longitudinal path, and
    (c) applying said electrical current and said magnetic field at strengths sufficient to cause said stream of molten glass alternately to be deflected by an amount sufficient to interrupt the flow of electrical current through said stream and to recede under the influence of gravity to a position allowing the reintroduction of said electrical current into said stream.

12. The method of facilitating separation of a stream of molten glass into particles which comprises:
    (a) applying a direct electrical current through an arc from an electrode located adjacent to said stream and along at least a portion of said stream,
    (b) applying a magnetic field extending across at least a part of said portion of said stream having lines of force with components perpendicular to said longitudinal path, and
    (c) applying said electrical current and said magnetic field so as to cause said stream alternately to be deflected in a direction away from said electrode so as to extinguish said arc and to recede in the direction of said electrode to reignite said arc, whereby alternate ignition and extinction of said arc produces oscillation of said stream.

References Cited by the Examiner

UNITED STATES PATENTS

| 2,158,415 | 5/1939 | Fromhals | 264—10 |
| 2,398,455 | 4/1946 | Unger | 264—9 |
| 2,859,560 | 11/1958 | Wald et al. | 65—21 |
| 2,889,580 | 6/1959 | Wald et al. | 65—21 |
| 3,171,714 | 3/1965 | Jones et al. | 65—21 |

DONALL H. SYLVESTER, *Primary Examiner.*

G. R. MYERS, *Assistant Examiner.*